UNITED STATES PATENT OFFICE.

WILLIAM M. BAKER, OF FORTVILLE, INDIANA.

HARROW.

SPECIFICATION forming part of Letters Patent No. 616,817, dated December 27, 1898.

Application filed September 3, 1896. Serial No. 604,775. (No model.)

*To all whom it may concern:*

Be it known that I, WILLIAM M. BAKER, a citizen of the United States, residing at Fortville, in the county of Hancock and State of Indiana, have invented certain new and useful Improvements in Harrows; and I do hereby declare the following to be a full, clear, and exact description of the invention, such as will enable others skilled in the art to which it appertains to make and use the same.

This invention relates to improvements in harrows; and it consists of certain novel constructions, combinations, and arrangements of parts, all of which will be hereinafter more fully described and claimed.

Figure 1:
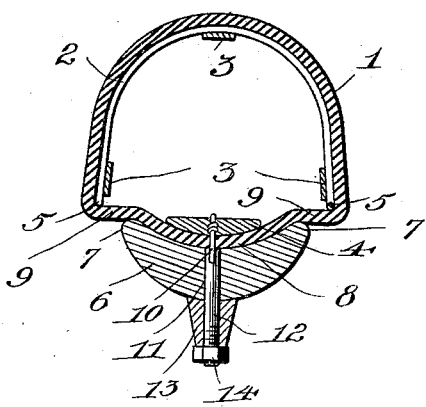
Figure 2:
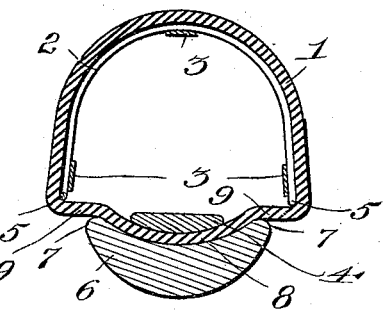
Figure 3:
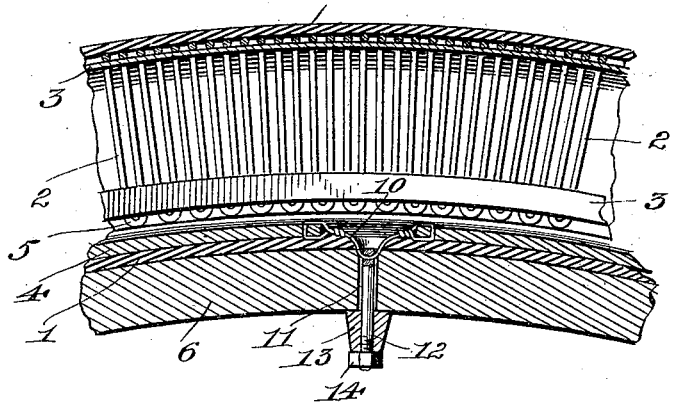
Figure 4:
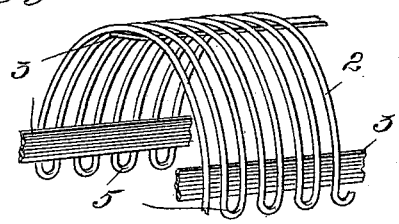

Figure 1 is a side elevation of my device; Fig. 2, a top plan view thereof; Fig. 3, an elevation from the rear of the harrow-frame, and Fig. 4 illustrates a modification in which two harrow-frames are used together.

The object of my invention is to so combine a roller and a harrow that the result will be a more perfect crushing and pulverizing of the soil than with the ordinary implements. This result is secured in the manner and by the means following:

A rectangular frame first is made to include two rollers B and C. The head roller B is provided with radial spikes or teeth projecting some little distance therefrom and arranged in an irregular manner therein. This roller will by means of the spikes be certain of breaking up the large and hard clods often found in plowed fields. It will also act as a roller to somewhat crush the same. The second roller C, which is pivoted in the frame A just back of the roller B, has a slightly-larger diameter than the roller B. As a consequence it bears more heavily upon the clods, more thoroughly crushing them and pulverizing the soil.

Back of the roller C is a cross-bar F, built in the frame A. This cross-bar has pivots F', which engage lugs *f* upon the harrow-frame. The harrow-frame D has a number of bars D' extending across the same. These bars D' are journaled at their ends in the frame D, so that it may rock backward and forward. The bars D' receive the harrow-teeth.

One or more of the rows of teeth E, extending from the front to the back, extend above the bars D' and are provided with ears G. To these ears is pivoted a bar H. This bar H at its rear end has a series of three or more holes. The frame A near the rear end of this bar H has an upright I. This upright has one or more holes in it, and the bar H is connected thereto by means of a pin. In this way the teeth E may all be set and held at the same angle. One of the holes in the bar H sets the teeth so that their points slope forward. This will give the teeth a digging or plowing action. The next hole sets the teeth vertically. This gives a harrowing or crushing action. The next hole sets the teeth with the points sloping to the rear. This gives the dragging and leveling action. By this means the harrow may be set to correspond with the conditions of the ground, with the result desired, and the points of the teeth may be ranged in a common inclined plane, so that each succeeding transverse row of teeth will be in a slightly-lower plane than the preceding one.

If it is desired to dispense entirely with the harrow, it may be swung forward upon its pivot until the teeth so rest that they will have no effect at all. A double harrow-frame is shown in Fig. 4. One of these frames is in advance of the other. By using the double frames one of the frames may be set in one position and the other frame in another, thus getting a combination of the different actions of the teeth, due to the variation of their angle.

With my device a more thorough pulverizing and loosening of the soil may be had than with any ordinary harrow. It is, in fact, a roller and harrow-combined. The manner of the combination is such that the harrow may be smaller with the same effect than if the two were entirely separate.

Having thus described my invention, what I claim as new, and desire to secure by Letters Patent, is—

1. In a harrow, a series of harrow-teeth, bodily adjustable in height and collectively adjustable as to their angles, and a single adjusting device for simultaneously effecting both adjustments, substantially as described.

2. In a harrow, pivoted teeth, in combination with means for simultaneously tilting the teeth on their pivots and raising or low- No. 616,818.  J. C. H. BAGGER.  Patented Dec. 27, 1898.
TIRE.
(Application filed Apr. 29, 1898.)

(No Model.)

Witnesses

Inventor
Jacob C. H. Bagger.
by V. S. Stockbridge,
his Attorney.